United States Patent [19]

Honda et al.

[11] Patent Number: 4,722,869
[45] Date of Patent: Feb. 2, 1988

[54] MAGNETIC RECORDING MEDIUM

[75] Inventors: Yukio Honda, Fuchu; Masaaki Futamoto, Kanagawa; Kazuetsu Yoshida, Kodaira; Yasutaro Uesaka, Kokubunji, all of Japan

[73] Assignee: Hitachi, Ltd., Tokyo, Japan

[21] Appl. No.: 879,614

[22] Filed: Jun. 25, 1986

[30] Foreign Application Priority Data

Jul. 3, 1985 [JP] Japan ................. 60-144596

[51] Int. Cl.$^4$ .............................. G11B 5/66
[52] U.S. Cl. .................... 428/611; 428/615; 428/641; 428/646; 428/648; 428/658; 428/660; 428/668; 428/928
[58] Field of Search ............... 428/658, 615, 641, 668, 428/928, 611, 679, 646, 648, 660; 427/132; 204/192.2

[56] References Cited

U.S. PATENT DOCUMENTS

| 3,520,664 | 7/1970 | York | 427/132 |
| 4,632,883 | 12/1986 | Howard et al. | 428/611 |
| 4,652,499 | 3/1987 | Howard | 428/641 |
| 4,657,824 | 4/1987 | Howard | 428/611 |

FOREIGN PATENT DOCUMENTS

| 93838 | 11/1983 | European Pat. Off. | 428/928 |
| 195325 | 12/1982 | Japan | 428/667 |
| 125235 | 7/1983 | Japan | 428/667 |
| 57524 | 4/1985 | Japan | 428/667 |

OTHER PUBLICATIONS

J59077620-A (8424, Suwa Seikosha KK, 10-82, Abstract, 1 page.
K. Y. Ahn et al., Hard Magnetic Films for Magnetic Rrecording, IBM Technical Disclosure Bulletin, vol. 21, No. 10, Mar. 1979, pp. 4232-4233.
Kobayashi et al., High Density Perpendicular Magnetic Recording on Rigid Disks, Fujitsu Sci. Tech. J., 19, 1, pp. 99-126, Mar., 1983.

*Primary Examiner*—John J. Zimmerman
*Attorney, Agent, or Firm*—Antonelli, Terry & Wands

[57] ABSTRACT

Disclosed is a magnetic recording medium comprising a predetermined substrate having or not having a soft magnetic thin film provided thereon, a layer formed thereon for controlling the columnar crystal grain size in a thin magnetic film formed on the substrate, and the thin magnetic film provided on the columnar crystal grain size control layer. The above-mentioned columnar crystal grain size control layer is a film having a close-packed hexagonal lattice structure and made of one element selected from among Ru, Sc, Y, and Zn, or two or more elements selected from among Ru, Sc, Y, Zn, and Ti; or a film having a close-packed hexagonal lattice structure and made of Co or a Co-based alloy. The columnar crystal grain size control layer may consist of two layers, the under layer of which is made of one or more elements selected from among Si, Ge, and Sn.

11 Claims, 4 Drawing Figures

MAGNETIC RECORDING MEDIUM

BACKGROUND OF THE INVENTION

The present invention relates to a magnetic recording medium adapted to perpendicular magnetic recording.

The perpendicular magnetic recording system is a means for magnetic recording in a direction perpendicular to the film surface of a magnetic recording medium, and is suitable for increasing the magnetic recording density since the demagnetizing field in every bit is small in high density magnetic recording. Magnetic recording media usable for this purpose include those using a thin film of a Co-based alloy such as Co-Cr, Co-V, Co-Mo, Co-W, Co-Ru, Co-Re, Co-O, Co-Cr-Rh, Co-Cr-Ru, or Co-Ni-O. The Co-based alloy constituting the thin magnetic film is characterized in that it has a close-packed hexagonal (h. c. p.) lattice structure and consists of fine crystal grains liable to be oriented in respect of their c-axes. In order to improve the magnetic recording characteristics, not only must c-axis dispersion of the thin Co-based alloy film be decreased, but also the size of fine columnar crystal grains must be controlled. As discussed by Iwasaki et al. in "Perpendicular Magnetic Recording with Composite Anisotropy Film", IEEE, Trans. Magnetics, MAG-15, 1456 (1979), provision of a thin film layer of a soft magnetic material such as Permalloy under the thin Co-based alloy film is effective in improving the magnetic recording sensitivity.

The perpendicular magnetic recording medium used today comprises a non-magnetic substrate such as a plastic film of polyimide or polyethylene terephthalate or an Al or glass plate, and a thin Co-based alloy film directly deposited thereon or formed with a thin film layer of a soft magnetic material such as Permalloy therebetween for the purpose of improving the magnetic recording sensitivity. In the case of a thin Co-based alloy film directly deposited on the non-magnetic substrate, the c-axis dispersion ($\Delta\theta_{50}$) thereof is about 8° to 9°, and the columnar crystal grain size is not controlled at all with quite irregular grains, with the result that it is poor in the performance characteristics as a high density magnetic recording medium. With a view to improving the c-axis dispersion of the thin Co-based alloy film as the above-mentioned magnetic layer, Sugita et al. has proposed a process comprising depositing Ti on a non-magnetic substrate by the vacuum evaporation technique, and providing thereon a magnetic layer or forming a thin permalloy (Ni-20 wt.% Fe alloy) film layer between the thin Ti film layer and a magnetic layer as provided above (Japanese Patent Laid-Open No. 77,025/1983). This process can provide a thin Co-based alloy film having a c-axis dispersion $\Delta\theta_{50}$ of about 6 to 8°. However, a higher value of $\Delta\theta_{50}$ is required of a further higher density magnetic recording medium, and a thin film comprising columnar crystal grains so controlled as to have adequate sizes must be provided in order to improve the magnetic recording characteristics. In the case of a thin Co-based alloy film as the magnetic layer under which a thin film layer of a soft magnetic material is provided, the c-axis dispersion thereof is poorer than that of the Co-based alloy film directly provided on the non-magnetic substrate, and a grave difficulty is encountered in controlling the size of columnar crystal grains in the thin film.

SUMMARY OF THE INVENTION

An object of the present invention is to provide a perpendicular magnetic recording medium comprising a thin film having an improved columnar crystal grain size and an improved c-axis dispersion.

The above and other objects of the present invention can be attained by a magnetic recording medium comprising a predetermined substrate having or not having a thin film of a soft magnetic material provided thereon, a layer formed thereon for controlling the columnar crystal grain size in a thin magnetic layer, and the above-mentioned thin magnetic film provided on the columnar crystal grain size control film.

DETAILED DESCRIPTION OF PREFERRED EMBODIMENTS

Figure 1:
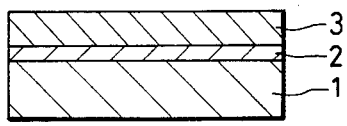
FIGS. 1, 2, 3, and 4 are partial cross-sectional views of examples of the perpendicular magnetic recording medium of the present invention.

The present invention has been completed based on the following knowledge. Specifically, Co with the close-packed hexagonal lattice structure (hereinafter referred to as the "hcp structure") has a large magnetocrystalline anisotropy in the c-axis direction. When a thin Co-based alloy film of such Co containing an element such as Cr, V, or Mo added thereto is formed on a non-magnetic substrate, a perpendicular anisotropy film having the c-axis oriented perpendicularly to the surface of the film can be obtained. Growth of the thin Co-based alloy film is largely affected by the surface state of the substrate on which the thin film is deposited. When the mode of growth of the thin Co-based alloy film being formed on the non-magnetic substrate is cross-sectionally observed through a transmission electron microscope, it is found to comprise an initial stage of thin film growth wherein aggregates of fine crystals are formed and a subsequent film thickness increasing stage of thin film growth wherein columnar crystals having the c-axis of the hcp structure oriented perpendicularly to the surface of the film are formed. Therefore, the columnar crystal grain size in the thin Co-based alloy film varies in the thickness-wise direction of the thin film. In order to control the columnar crystal grain size in the thin Co-based alloy film from the initial stage of thin film growth, it may be conceivable to provide a crystal grain size control layer between the substrate and the thin Co-based alloy film. One conceivable method for materializing this may comprise preliminary formation on a non-magnetic substrate of a crystal grain size control layer made of Ru, Zn, Sc, Y or the like, or an alloy containing Ru, Zn, Sc, Y, Ti or the like and having the same hcp structure as in the case of Co; and formation of a thin Co-based alloy film on the crystal grain size control layer with the hcp structure. A crystal grain size control layer containing Ru will be described by way of example. The inter-atomic distance of Ru in the plane (001) is 2.64Å, while that of Co with the hcp structure in the plane (002) is 2.49Å. Thus, the two values are very close. Therefore, the thin Co-based alloy film undergoes epitaxial growth on the crystal grain size control layer made of Ru in accordance with the crystal grain size in the crystal grain size control layer despite a slight mismatch in crystal lattice. Accordingly, in order to improve the controllability of the columnar crystal grain size in the thin Co-based alloy film, crystal grains with the hcp structure in the crystal grain size control layer must be controlled. To attain this, the inventors of the present invention have examined the size of columnar crystal grains in crystal grain size control films with the hcp structure formed at varied surface temperatures of a non-magnetic substrate. As a result, they have found that the columnar crystal grain size in a crystal grain size control layer can be arbitrarily controlled in accordance with the temperature of the substrate, and hence a thin Co-based alloy film having the same columnar crystal grain size as in the crystal grain size control layer can be formed when the thin film is formed on the crystal grain size control layer as described above.

Based on an idea that control of the surface state of a substrate on which a crystal grain size control layer with the hcp structure is formed may have to be controlled in order to improve the controllability of the columnar crystal grain size in the thin Co-based alloy film, the inventors of the present invention have examined through a transmission electron microscope the state of crystal growth in a second crystal gain size control layer of Ru or the like with the hcp structure formed on an extremely thin first crystal grain size control layer of a non-magnetic material formed on a surface of a non-magnetic substrate made of plastic, glass, or Al. The formation of the extremely thin first crystal grain size control layer has aimed at materialization of a surface state of the underlayer which will facilitate growth of columnar crystals with uniform grain sizes in the second crystal grain size control layer of Ru or the like with the hcp structure. As a result of studies on non-magnetic materials forming the first crystal grain size control layer, it has been found that, when the second crystal grain size control layer of Ru or the like with the hcp structure is formed on a thin film made of Si, Ge, Sn, or an alloy thereof, crystals in the second crystal grain size control layer grow uniform. it has also been confirmed that the uniformity in size of columnar crystal grains grown in the thin Ru film as the second crystal grain size control layer formed on the first crystal grain size control layer made of Si, Ge, Sn, or an alloy thereof tends to be substantially constant with a given value irrespective of the kind of substrate, and that this tendency is true of thin hcp structure films other than the thin Ru film, for example, thin films made of Sc, Y, Zn, or an alloy containing Ru, Sc, Y, Zn, Ti, or the like. An equivalent effect has also been found where a very thin Co or Co-based alloy film with the hcp structure is used as the second crystal grain size control layer, which is, however, preferably different in composition from the thin magnetic layer. It has also been confirmed that, in formation of first and second crystal grain size control layers, an effective crystal grain size control layer can be formed according to any one of physical evaporation techniques such as vacuum evaporation, high frequency sputtering, and ion beam sputtering techniques.

Further, the inventors of the present invention have confirmed that the columnar crystal grain size in the thin Co-based alloy film can be adequately and arbitrarily controlled by forming the above-mentioned crystal grain size control layer also in a magnetic recording medium comprising a Co-based amorphous soft magnetic thin film made of, for example, Co-Mo-Zr, Co-Mo-Nb, Co-W-Nb, or Co-Nb-Zr, or a thin amorphous film made of a high permeability alloy, which is formed as the under-layer of the thin Co-based alloy film serving as the perpendicular anisotropy film. More specifically, it has been found that a thin Co-based alloy film comprising uniform columnar crystal grains better controlled in size can be formed by providing a first crystal grain size control layer made of Si, Ge, Sn, or an alloy thereof on a Co-based amorphous soft magnetic thin film, forming thereon a second crystal grain size control layer with the hcp structure made of Ru, Sc, Y, Zn or the like, or an alloy containing Ru, Sc, Y, Zn, Ti or the like, and subsequently forming thereon the thin Co-based alloy film. As a result of examination of the crystal structures of thin films made of Si, Ge, Sn, or an alloy thereof by the X-ray diffraction technique, it has been found that all the thin films were amorphous. In the case of Si, Ge, and Sn, the crystal structure is that of a diamond having a tetrahedral arrangement with an inter-atomic distance, between most closely neighboring atoms, of 2.35Å, 2.45Å, and 2.80Å, respectively. These values are close to those of Ru, Sc, Y, Zn or the like, or an alloy containing Ru, Sc, Y, Zn, Ti or the like, which have the hcp structure. This is believed to be the reason for growth of a thin film comprising columnar crystal grains uniform in size and having a better c-axis dispersion. A thin Co-based alloy film good in controllability of the columnar crystal grain size and excellent in magnetic properties can be formed by forming the thin Co-based alloy film on a second crystal grain size control layer comprising columnar crystal grains uniform in size, having the hcp structure and made of Ru, Sc, Y, Zn or the like, or an alloy containing Ru, Sc, Y, Zn, Ti or the like.

The thickness of the layer of Si, Ge, Sn, or an alloy thereof, which is the first crystal grain size control layer in the magnetic recording medium of the present invention, is preferably 100°Å or larger in view of the fact that a thickness of less than 100°Å is insufficient for removal of the influence of the substrate surface. Although the effect of controlling the columnar crystal grain size dones not vary even at a thickness exceeding 1 μm, the layer forming time is prolonged and the layer is subject to cracking in the case of forming the thin layer on a plastic film. Therefore, the thickness of the layer is preferably 1μm or smaller. A still preferred thickness of the layer in a practical sense is in a range of 150 to 3,000Å. Since the second crystal grain size control layer made of Ru, Sc, Y, Zn or the like, or an alloy containing Ru, Sc, Y, Zn, Ti or the like and having the hcp structure very easily grows on the above-mentioned first crystal grain size control layer, the practically preferred thickness of the second layer is in a range of 100 to 3,000Å.

When only a thin film made of Ru, Sc, Y, Zn, or an alloy thereof and having the hcp structure is used as the columnar crystal grain size control layer, the layer thickness desired for the purpose of attaining unformity of the columnar crystal grain size is in a range of 150 to 3,000Å.

In the magnetic recording medium of the present invention, the soft magnetic thin film provided under the crystal grain size control layer is not limited to Co-based amorphous soft magnetic materials, but may be of any kind of thin amorphous alloy film having a high permeability.

In formation of a crystal grain size control film, a thin Co-based magnetic film, and an amorphous soft magnetic thin film in the magnetic recording medium of the present invention, the substrate temperature and the thin film forming rate must be controlled. In controlling the columnar crystal grain size in the crystal grain size control layer made of Ru, Sc, Y, Zn or the like, or an alloy thereof and having the hcp structure, the substrate temperature is preferably 100° to 400° C. At a substrate temperature of lower than 100° C., the adhesion of the control layer to the underlayer is poor. A substrate temperature exceeding 400° C. unfavorably presents a problem concerning the thermal resistance of the substrate, and provides deterioration in the c-axis dispersion of crystals. In formation of a thin film made of Si, Ge, Sn, or an alloy thereof as the first crystal grain size control layer, a substrate temperature of lower than 100° C. provide a poor adhesion of the thin film to the underlayer, while a substrate temperature exceeding 300° C. gives rise to polycrystal formation in the thin layer to cause the c-axis dispersion of the second crystal grain size control layer with the hcp structure formed thereon to be poor. Thus, the preferred temperature range is 100° to 300° C. In formation of the amorphous soft magnetic thin film, a substrate temperature of lower than 100° C. provides a poor adhesion of the film to the underlayer, while a substrate temperature exceeding 400° C. deteriorates the magnetic properties of the material of the amorphous soft magnetic thin film. Thus, the preferred temperature range is 100° to 400° C. In formation of the thin Co-based alloy film as the perpendicular anisotropy film of the magnetic recording medium, a film forming temperature of lower than 100° C. provides a poor adhesion of the film to the underlayer and a difficulty in forming a film having magnetic properties adapted to high density magnetic recording, while a film forming temperature exceeding 300° C. provides a poor c-axis dispersion of crystals. Thus, the preferred temperature range is 100° to 300° C.

The thin film forming rate for giving c-axis orientation of the hcp structure to the crystal grain size control layer and the thin Co-based alloy magnetic film of the magnetic recording medium of the present invention is preferably in a range of 1 to 3,000Å/s. When it is less than 1Å/s, the c-axis dispersion of crystals is poor because of a reaction of the material with the residual gas ($O_2$, $N_2$, CO, $CO_2$, $H_2O$, etc.) contained in a vacuum atmosphere, which is allowed to proceed due to too slow a thin film forming rate. When it exceeds 3,000Å/s, too small crystal grains are formed with difficult control of the crystal grains size, and the vacuum evaporation apparatus must disadvantageously have a large dimension.

Physical evaporation techniques such as vacuum evaporation, high frequency sputtering, and ion beam sputtering techniques can be employed as the method of forming a thin film in the magnetic recording medium of the present invention. As for the method of controlling the columnar crystal grain size in the crystal grain size control layer, besides control of the above-mentioned temperature in thin film formation (substrate temperature) and control of the thin film forming rate, the crystal grain size can be controlled by varying the sputtering power and the pressure of a sputtering gas (e.g., Ar) in the case of using the sputtering technique.

The present invention will now be illustrated in more detail with reference to the following Examples and the drawings, wherein portions having the same symbols attached thereto should be interpreted as having the same performance characteristics.

EXAMPLE 1

A perpendicular magnetic recording medium having a structure comprising a polyimide film substrate 1, a thin Co-Cr magnetic film 3, and a crystal grain size control layer 2 of Ru with the hcp structure provided between the substrate 1 and the magnetic film 3 as shown in FIG. 1 was prepared according to the following procedure.

The substrate 1 was heated at a temperature of 110°, 140°, 170°, or 200° C. in a vacuum of $2 \times 10^{-6}$ Torr. Ru was deposited on the substrate by the vacuum evaporation technique at a rate of 10Å/s to form a crystal grain size control layer 2 with the hcp structure having a thickness of 300Å. In the same vacuum vessel, the substrate temperature was set at 150° C., and Co-23 wt. % Cr was further deposited by the vacuum evaporation technique at a rate of 100Å/s to form a thin Co-Cr magnetic film 3 having a thickness of 2,500Å. On the other hand, Co-23 wt. % Cr was directly deposited on a polyimide film substrate by the vacuum evaporation technique at a substrate temperature of 150° C. and a rate of 100Å/s to form a thin Co-Cr magnetic film having a thickness of 2,500Å as a control.

Table 1 shows a comparison between various conditions in columnar crystal grain size (Å), c-axis dispersion [$\Delta\theta_{50}$ (degree)], magnetic properties [saturation magnetization (emu/cc) and vertical coercive force (Oe)] of a thin Co-Cr magnetic film. The columnar crystal crystal grain size was measured by observing the cross-section of a thin Co-Cr magnetic film through a transmission electron microscope. The c-axis dispersion of a thin Co-Cr magnetic film was evaluated in terms of half-value width in the X-ray diffraction locking curve. The smaller the value of $\Delta\theta_{50}$, the better the c-axis dispersion. The magnetic properties were measured with a VSM (vibrating sample magnetometer).

TABLE 1

| Properties | None (Reference Example) | Crystal grain size control layer Temperature of forming crystal grain size control layer of Ru with hcp structure | | | |
|---|---|---|---|---|---|
| | | 110° C. | 140° C. | 170° C. | 200° C. |
| Columnar crystal grain size in thin Co—Cr magnetic film (Å) | 100~600 | 100~200 | 200~400 | 400~600 | 600~800 |
| c-Axis dispersion of thin Co—Cr magnetic film [$\Delta\theta_{50}$ (°)] | 10 | 7.4 | 7.4 | 7.5 | 7.6 |
| Magnetic properties | | | | | |
| Saturation magnetization (emu/cc) | 320 | 325 | 320 | 330 | 325 |
| Vertical coercive force (Oe) | 600 | 620 | 625 | 630 | 610 |

As is demonstrated in Table 1, the varied temperatures for formation of a crystal grain size control layer of Ru with the hcp structure were able to provide thin Co-Cr magnetic films having an adequate and arbitrary columnar crystal grain size while keeping the values of c-axis dispersion [$\Delta\theta_{50}$ (degree)], saturation magnetization (emu/cc) and vertical coercive force (Oe) as magnetic properties of the thin Co-Cr magnetic film on substantially constant levels.

EXAMPLE 2

Figure 2:
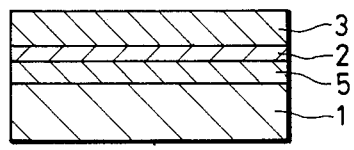

A perpendicular magnetic recording medium comprising an amorphous soft magnetic thin film 5 of a Co-Mo-Zr alloy provided as the underlayer of a crystal grain size control layer 2 (upper layer of a substrate 1) as shown in FIG. 2 was prepared according to substantially the same procedure as in Example 1 except that the amorphous soft magnetic thin film 5 made of Co-0.2 at (atomic) % Zr-0.7 at % Mo and having a thickness of 5,000Å was formed using a high frequency sputtering apparatus under the conditions including a substrate temperature of 150° C., an Ar gas partial pressure of 5 mTorr, and a high frequency power in sputtering of 4 W/cm².

In this case also, performance characteristics substantially equivalent to the results shown in Table 1 of Example 1 were secured.

EXAMPLE 3

Figure 3:
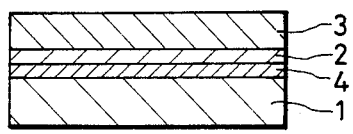

A perpendicular magnetic recording medium having a structure comprising a polyimide film substrate 1, a thin Co-Cr magnetic film 3, and a first crystal grain size control layer 4 of Ge and a second crystal grain size control layer 2 of Ru with the hcp structure both formed between the substrate 1 and the magnetic film 3 as shown in FIG. 3 was prepared according to the following procedure.

The substrate 1 was heated at a temperature of 180° C. in a vacuum of $2 \times 10^{-6}$ Torr. Ge was deposited on the substrate by the vacuum evaporation technique at a rate of 10Å/s to form a first crystal grain size control layer 4 having a thickness of 300Å. The substrate temperature was then set at a temperature of 110°, 140°, 170°, or 200° C. Ru was deposited thereon by the vacuum evaporation technique at a rate of 10Å/s to form a second crystal grain size control layer 2 with the hcp structure having a thickness of 300Å. In the same vacuum vessel, the substrate temperature was set at 150° C., and Co-23 wt. % Cr was further deposited by the vacuum evaporation technique at a rate of 100Å/s to form a thin Co-Cr magnetic film 3 having a thickness of 2,500Å.

Table 2 shows a comparison among various conditions in columnar crystal grain size (Å), c-axis dispersion [$\Delta\theta_{50}$ (degree)], and magnetic properties of a thin Co-Cr magnetic film.

TABLE 2

| Properties | Temperature of forming second crystal grain size control layer (Ru) | | | |
|---|---|---|---|---|
| | 110° C. | 140° C. | 170° C. | 200° C. |
| Columnar crystal grain size in second crystal grain size control layer (Å) | 100 ± 50 | 300 ± 50 | 500 ± 50 | 700 ± 50 |
| Columnar crystal grain size in thin Co—Cr magnetic film (Å) | 100 ± 30 | 300 ± 30 | 500 ± 30 | 700 ± 30 |
| c-Axis dispersion of thin Co—Cr magnetic film [$\Delta\theta_{50}$ (°)] | 5.1 | 5.3 | 5.2 | 5.3 |
| Magnetic properties | | | | |
| Saturation magnetization (emu/cc) | 320 | 325 | 330 | 310 |
| Vertical coercive force (Oe) | 620 | 625 | 630 | 615 |

As is demonstrated in Table 2, the first crystal grain size control layer 4 of Ge provided under the second crystal grain size control layer 2 of Ru with the hcp structure was able to serve for controlling the columnar crystal grain size in the second crystal grain size control layer 2 in accordance with the temperature of forming the second crystal grain size control layer 2. As a result, columnar crystal grains in the thin Co-Cr magnetic film 3 were also very well controlled to an adequate and arbitrary size. The first crystal grain size control layer 4 of Ge provided under the second crystal grain size control layer 2 was also able to serve for improving the c-axis dispersion of the thin Co-Cr magnetic film 3. The first crystal grain size control layer 4 of Ge was recognized to be amorphous as a result of examination by the X-ray diffraction technique.

EXAMPLE 4

Figure 4:
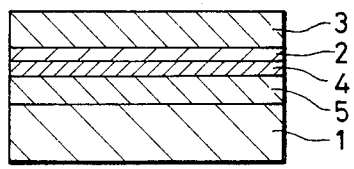

A perpendicular magnetic recording medium having a structure comprising a glass substrate 1 of 3 inches in diameter, a soft magnetic thin film 5 formed on the substrate, and a first crystal grain size control layer 4, and a second crystal grain size control layer 2 and a thin Co-Cr magnetic film 3 formed on the film 5 in this sequence as shown in FIG. 4 was prepared according to the following procedure.

The amorphous soft magnetic thin film 5 made of Co-0.2 at % Zr-0.7 at % Mo and having a thickness of 5,000Å was formed using a high frequency sputtering apparatus under the conditions including a substrate temperature of 150° C., an Ar gas partial pressure of 5 mTorr, and a high frequency power in sputtering of 4W/cm². Si was deposited on the soft magnetic thin film 5 under the conditions including an Ar gas partial pressure of 3 mTorr, and a high frequency power in sputtering of 4 W/cm² to form the first crystal grain size control film 4 having a thickness of 500Å. Zn was then deposited to form the second crystal grain size control film having a thickness of 500Å. Subsequently, Co-18 wt. % Cr was deposited in a thickness of 2,000Å under an Ar gas partial pressure of 3 mTorr at a high frequency power of 8 W/cm². While keeping constant temperatures of formation of the soft magnetic thin film 5, the first crystal grain size control layer 4 of Si, and the thin Co-Cr magnetic film, the temperature of forming the second crystal grain size control layer 2 was varied to be 90°, 120°, 150°, or 180° C. Thus, perpendicular magnetic recording media having the structure as shown in FIG. 4 was prepared. On the other hand, a perpendicular magnetic recoding medium having a thin Co-Cr magnetic film and no first nor second crystal grain size control layers was prepared as a control under substantially the same conditions as in this Example. Table 3 shows a comparison in columnar crystal grain size (Å), c-axis dispersion [$\Delta\theta_{50}$ (degree)], and magnetic properties of a thin Co-Cr magnetic film.

TABLE 3

| Properties | Crystal grain size control layer | | | | |
|---|---|---|---|---|---|
| | None (Reference Example) | Temperature of forming second crystal grain size control layer | | | |
| | | 90° C. | 120° C. | 150° C. | 180° C. |
| Columnar crystal grain size in thin Co—Cr magnetic film (Å) | 80~500 | 110 ± 30 | 250 ± 30 | 350 ± 30 | 550 ± 30 |
| c-Axis dispersion of thin Co—Cr magnetic film [$\Delta\theta_{50}$ (°)] | 8~15 | 4.7 | 4.6 | 4.8 | 4.6 |
| Magnetic properties | | | | | |
| Saturation magnetization (emu/cc) | 310 | 320 | 325 | 310 | 330 |
| Vertical coercive force (Oe) | 620 | 600 | 610 | 615 | 620 |

As is apparent from Table 3, formation of the amorphous soft magnetic film on the substrate, the first and second crystal grain size control layers thereon, and the thin Co-Cr magnetic film thereon enabled arbitrary control of the columnar crystal grain size while keeping the values of c-axis dispersion and magnetic properties of the thin Co-Cr magnetic film on substantially constant levels.

Although in the foregoing Examples the cases where the thin Co-Cr magnetic film was formed as an example of the thin Co-based alloy magnetic film were described, equivalent effects were seucred in the cases of using a thin Co-based alloy magnetic film made of other alloys such as Co-Ru, Co-V, Co-Mo, Co-W, Co-Re, Co-O, Co-Cr-Rh, Co-Cr-Ru, or Co-Ni-O.

As for the crystal grain size control layer with the hcp structure, effects equivalent to those of the foregoing Examples wherein Ru or Zn was used were secured also in the cases of using either Sc, Y, an alloy containing at least two members selected from among Ru, Zn, Sc, Y and Ti, or Co or a Co-based alloy. As for the first crystal grain size control layer, it was confirmed that effects equivalent to those in the cases of using Ge or Si were secured also in the cases of using Sn or an alloy containing at least two members selected from among Ge, Si and Sn.

As for the soft magnetic thin film, effects equivalent to those in the case of using an amorphous thin film of Co-Mo-Zr were secured also in the case of using other Co-based amorphous thin film of, for example, Co-Mo-Nb, Co-W-Nb, Co-Nb-Zr, or other amorphous materials having a high permeability.

As described above in detail, in the magnetic recording medium of the present invention, formation of a crystal grain size control layer made of either Ru, Sc, Y, Zn or an alloy thereof, or Co or a Co-based alloy, which provides the hcp structure, or a first crystal grain size control layer made of Si, Ge, Sn or an alloy thereof and a second crystal grain size control layer, which is the same as mentioned above as the crystal grain size control layer with the hcp structure, prior to formation of a thin Co-based alloy layer as the perpendicular recording film serves to improve controllability of the columnar crystal grain size in the thin Co-based alloy magnetic film formed on the control layer. This so favorably affects the c-axis dispersion of the thin magnetic film that the magnetic recording reproducibility can be largely improved. In this case, the underlayer may be either a soft magnetic thin film or a non-magnetic substrate, which is effective in obtaining a perpendicular magnetic recording medium adapted to high density magnetic recording. Thus, a great benefit in industrial utilization can be secured.

What is claimed is:

1. A magnetic recording medium comprising:
   a substrate;
   a soft magnetic thin film provided on said substrate;
   a layer provided on said soft magnetic thin film for controlling a columnar crystal grain size in a perpendicular magnetic anisotropy film, said layer for controlling the columnar crystal grain size consisting of a first crystal grain size control layer made of at least one element selected from the group consisting of Si, Ge and Sn, and a second crystal grain size control layer provided on said first crystal grain size control layer and having a close packed hexagonal lattice structure; and
   a perpendicular magnetic anisotropy film provided on said layer for controlling the columnar crystal grain size.

2. A magnetic recording medium according to claim 1, wherein said second crystal grain size control layer is made of one element selected from the group consisting of group consisting of Ru, Sc, Y, Zn and Ti.

3. A magnetic recording medium according to claim 1, wherein said second crystal grain size control layer is made of Co or a CO-based alloy different in material or composition from said perpendicular magnetic anisotropy film.

4. A magnetic recording medium according to claim 1, wherein said soft magnetic thin film is made of an amorphous Co-based alloy or an amorphous high permeability alloy.

5. A magnetic recording medium according to claim 4, wherein said amorphous Co-based alloy is a material selected form the group consisting of Co-Mo-Zr, Co-Mo-Nb, Co-Nb-Zr and Co-W-Nb.

6. A magnetic recording medium according to claim 1, wherein said perpendicular magnetic anisotropy film is made of at least one material selected from the group consisting of Co-Cr, Co-V, Co-Mo, Co-W, Co-Ru, Co-Re, Co-O, Co-Cr-Rh, Co-Cr-Ru and Co-Ni-O.

7. A magnetic recording medium comprising:
   a substrate;
   a layer provided on said substrate for controlling the columnar crystal grain size in a perpendicular magnetic anisotropy film, said layer for controlling the columnar crystal grain size consisting of a first crystal grain size control layer made of at least one element selected from the group consisting of Si, Ge and Sn, and a second crystal grain size control layer provided on said first crystal grain size control layer and having a close packed hexagonal lattice structure; and a perpendicular magnetic ansiotropy film provided on said second crystal grain size control layer.

8. A magnetic recording medium according to claim 7, wherein said second crystal grain size control layer is made of one element selected from the group consisting of Ru, Sc, Y and Zn, or at least two elements selected from the group consisting of Ru, Sc, Y, Zn and Ti.

9. A magnetic recording medium according to claim 7, wherein said second crystal grain size control layer is made of Co or a Co-based alloy different in material or composition from said perpendicular magnetic anisotropy film.

10. A magnetic recording medium according to claim 7, wherein said perpendicular magnetic anisotropy film is made of at least one material selected from the group consisting of Co-Cr, Co-V, Co-Mo, Co-W, Co-Ru, Co-Re, Co-O, Co-Cr-Rh, Co-Cr-Ru and Co-Ni-O.

11. A magnetic recording medium according to any one of claims 1, 2, 3, 7, 8 or 9, wherein said first crystal grain size control layer has a thickness of 100 to 3,000 Å and said second crystal grain size control layer has a thickness of 100 to 3,000 Å.

* * * * *